United States Patent [19]

Ormond

[11] Patent Number: 4,733,571
[45] Date of Patent: Mar. 29, 1988

[54] LINEARIZATION OF COLUMN-TYPE LOAD CELL

[76] Inventor: Alfred N. Ormond, 4010 Hermitage Dr., Hacienda Heights, Calif. 91745

[21] Appl. No.: 922,946

[22] Filed: Oct. 24, 1986

[51] Int. Cl.$^4$ .............................................. G01L 1/22
[52] U.S. Cl. ...................................... 73/862.65; 338/5
[58] Field of Search ................ 73/862.65, 862.66, 765; 338/2, 5

[56] References Cited

U.S. PATENT DOCUMENTS

| | | | |
|---|---|---|---|
| 2,576,417 | 11/1951 | Ruge | 73/862.65 X |
| 2,775,887 | 1/1957 | Hines | 338/5 X |
| 2,984,102 | 5/1961 | Soderholm | 73/862.65 |
| 3,621,927 | 11/1971 | Ormond | 73/862.65 X |
| 3,680,372 | 8/1972 | Ormond | 73/862.65 |
| 3,965,734 | 6/1976 | Ward et al. | 73/862.63 |
| 4,589,291 | 5/1986 | Sander | 73/862.65 |

Primary Examiner—Charles A. Ruehl
Attorney, Agent, or Firm—Freilich, Hornbaker, Rosen & Fernandez

[57] ABSTRACT

Column-type load cells having recessed portions on opposite sides to receive strain gauges mounted on the web in the recesses for more linear response are improved by reduced cross sections off each end of the recesses, and/or by flexures off each end, with adjustment of the diameter of the reduced diameter portions and the distances of the flexures from the recesses to adjust the linearization effect of the recesses. Diaphragms arranged either at one end or both ends are used to support a tube cover. Utilizing two diaphragms, one at each end of a tube cover has been found to improve linearization even without reduced cross sections and/or flexures.

7 Claims, 16 Drawing Figures

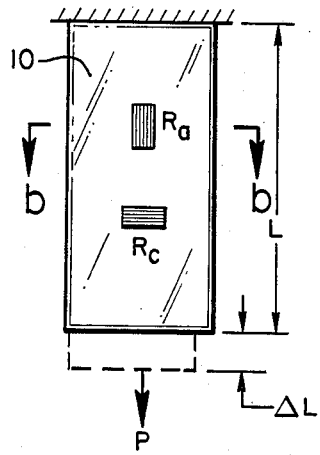
FIG. 1a
(PRIOR ART)
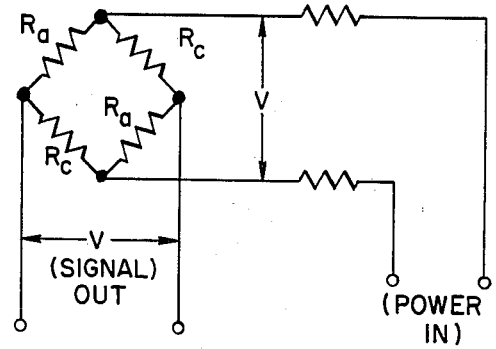
FIG. 2
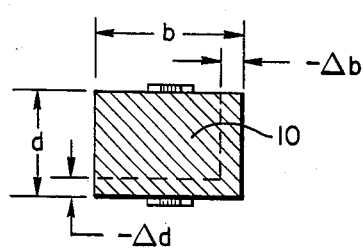
FIG. 1b
(PRIOR ART)
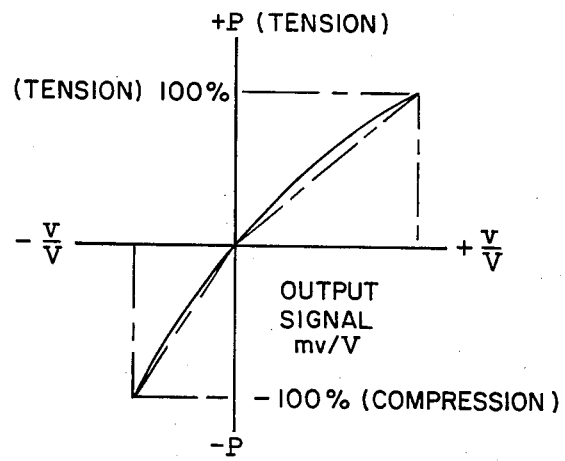
FIG. 3
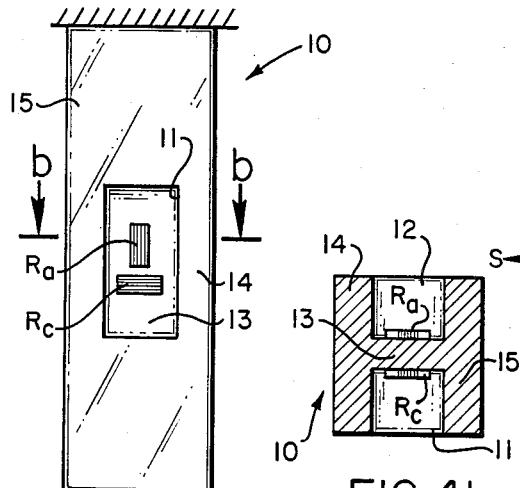
FIG. 4a
(PRIOR ART)
FIG. 4b
(PRIOR ART)
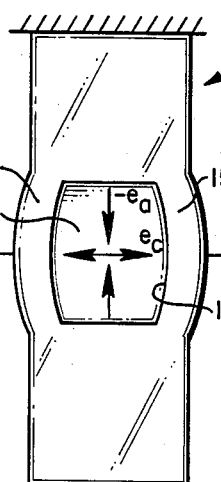
FIG. 5a
(PRIOR ART)
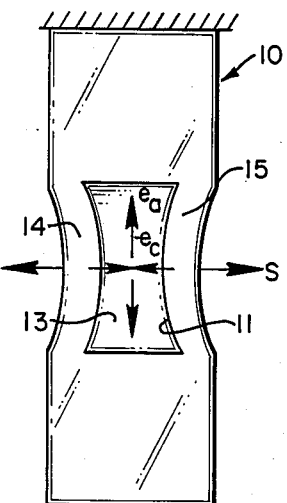
FIG. 5b
(PRIOR ART)

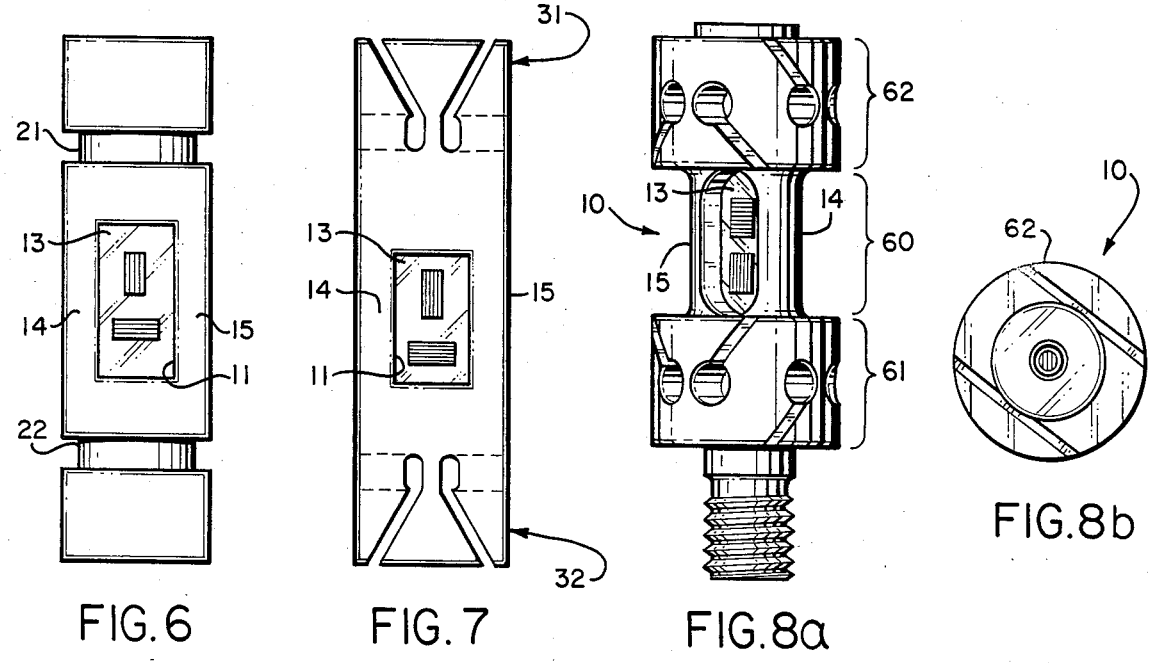
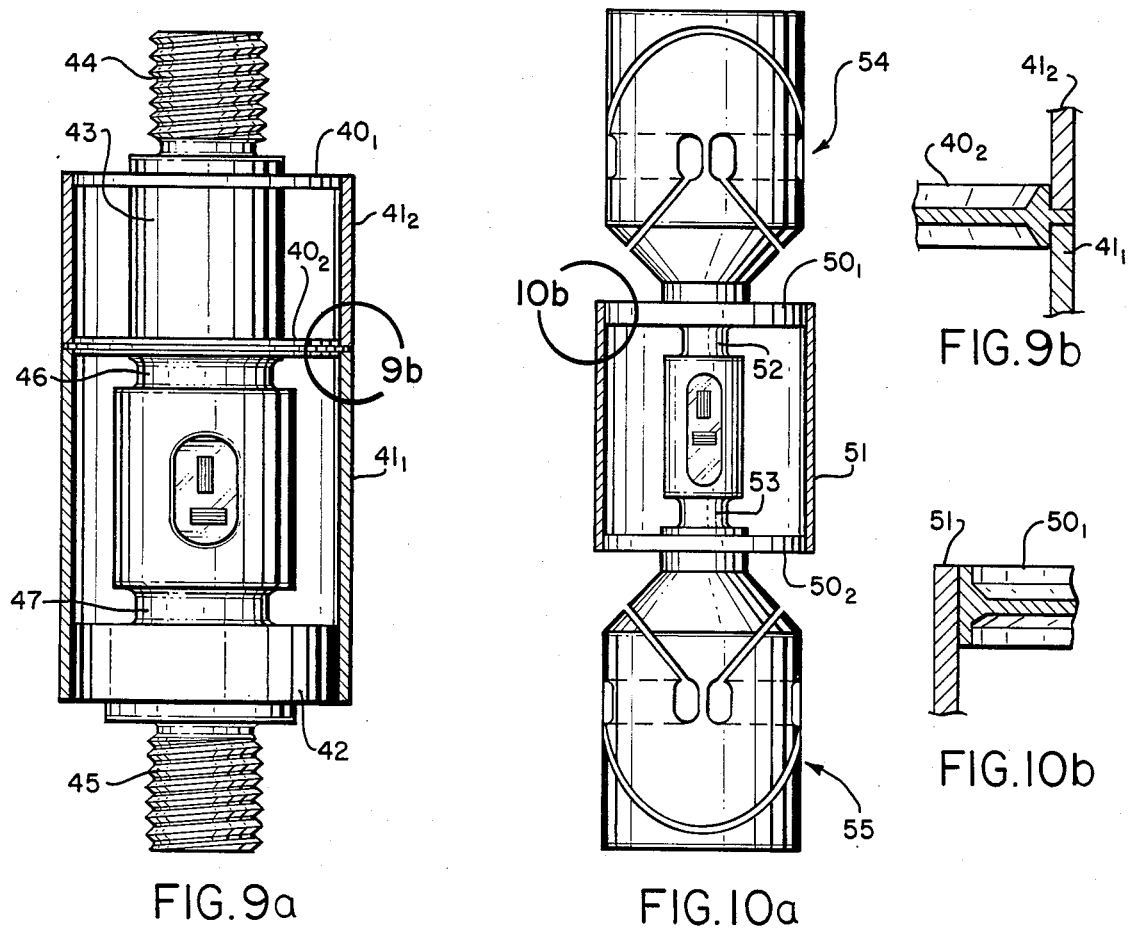

LINEARIZATION OF COLUMN-TYPE LOAD CELL

BACKGROUND OF THE INVENTION

This invention relates to column-type load cells, and more particularly to linearizing the output signal from that type of load cell.

One of the easiest types of load cells to manufacture is the column. However, as noted in my earlier U.S. Pat. No. 3,228,240, the output signal is not linear with a change in load due to extraneous strains resulting from either a nonlinear gauge factor or a nonlinear modulus of elasticity.

OBJECTS AND SUMMARY OF THE INVENTION

An object of this invention is to improve the linearization of column-type load cells having an H-shaped cross-section to provide a web portion where strain gauges are mounted (to measure axial and cross strain) so that a cross load is created that linearizes the output.

In accordance with the present invention, the column of a load cell having recesses on opposite sides to provide an H-shape cross section, i.e., to provide a web between flanges on which the strain gauges are mounted to form the load cell, is improved by providing reduced diameter sections in the column spaced from each end of the recessed portion. It has been found that by varying the reduced diameter, the linearizing effect of the recessed portion can be varied, thus allowing for a convenient way to make an adjustment in the linearizing effect of the recessed portion to a column designed for a particular application.

Yet another feature of the present invention is to provide a flexure on one or both ends of the column to eliminate any bending moment interaction. By adjusting the distance of the flexure from the end of the recesses, the linearizing effect on the H-shaped cross section can be varied. Thus, a flexure not only provides articulation for the load cell, but also provides a way of making an adjustment of the linearization required in a particular load cell for a given application.

Load cells provided with either feature for adjustment of the linearizing effect on the recesses in the column can easily be manufactured from a simple column.

BRIEF DESCRIPTION OF THE DRAWINGS

FIG. 1a is a schematic diagram of a conventional (prior art) column-type load cell under tension, and FIG. 1b illustrates a section taken along a line b—b of the column as shown in FIG. 1a.

FIG. 2 is a schematic diagram of four strain gauges connected in a bridge to provide an output signal v (millivolts) in response to strain on paired strain gauges $R_a$, $R_a$ and $R_c$, $R_c$ connected to a source of power V.

FIG. 3 is a graph of signal output (v) (millivolts) per applied voltage (V) as a function of tension and compression.

FIG. 4a illustrates schematically a column of a load cell having recesses machined on opposite sides to provide an H-shaped cross section as illustrated in FIG. 4b taken on line b—b in FIG. 4a. The recessed portion of the column provides a beam-column action that tends to linearize the v/V output of the load cell.

FIG. 5a illustrated deformation of the recessed portion of the column shown in FIG. 4a as a result of compression loading, and FIG. 5b illustrates deformation of the same portion as a result of tension loading.

FIG. 6 illustrates reduced diameter sections in the column of FIG. 4a on each end of the recessed portion which provides a means for varying the amount of beam-column action.

FIG. 7 illustrates schematically flexures on the ends of a column which provide articulation that eliminates any bending moment interaction and increases the amount of the beam-column action.

FIG. 8a illustrates a cylindrical column-type load cell with flexures fabricated at each end, and FIG. 8b illustrates a plan view of the upper end of the column shown in FIG. 8a.

FIG. 9a illustrates a load cell of the column type with two diaphragms for supporting a tube cover that is thus rigidly connected at only one end.

FIG. 9b illustrates in greater detail a portion of the diaphragm and tube cover shown in a circle 9b in FIG. 9a.

FIG. 10a illustrates a load cell of the column type with flexures at both ends, and with a cover tube held on the column by diaphragms at both ends.

FIG. 10b illustrates in greater detail a portion of the diaphragm and tube cover shown in a circle 10b in FIG. 10a.

DESCRIPTION OF PREFERRED EMBODIMENTS

Referring to FIG. 1a, a conventional column 10 is shown schematically with two strain gauges $R_a$ and $R_c$. Usually in practice, there are two additional strain gauges mounted on the other side and oriented in the same way for connection in a bridge, as shown in FIG. 2. The strain gauges $R_a$ are mounted for response to axial strains, and the strain gauges $R_c$ are mounted for response to cross strains. When the column 10 is loaded in tension, as indicated in FIG. 1a, the cross-sectional area is decreased due to Poisson's ratio, which is defined as the ratio of the contraction in one direction to the extension in an orthogonal direction. In terms of the contraction in cross section, i.e., in terms of $\Delta b$ and $\Delta d$ illustrated in FIG. 1b, to the extension $\Delta L$ shown in FIG. 1a, the Poisson ratio u is given by the following relationships:

$$\frac{1}{u} = \frac{\frac{\Delta L}{L}}{\frac{\Delta d}{d}} = \frac{\frac{\Delta L}{L}}{\frac{\Delta b}{b}} = \frac{e_a}{e_c} \quad (1)$$

where $e_a$ and $e_c$ are the axial strain and cross strain, respectively. The Poisson ratio u is obtained from these strains because $\Delta R_d/R_d = GFe_a$ and $\Delta R_c/R_c = GFe_c$, where GF is a gauge factor for the strain gauges. Thus, $$\frac{\frac{\Delta R_a}{R_a}}{\frac{\Delta R_c}{R_c}} = \frac{GFe_a}{GFe_c} = \frac{e_a}{e_c} = \frac{1}{u}. \quad (2)$$

Consequently, when the strain gauges are mounted in a full bridge, as shown in FIG. 2, the output signal as a function of load can be measured and plotted as shown in FIG. 3 for tension from zero to a maximum (+100%). Compression produces a similar output signal, but of opposite polarity, from zero to a maximum (−100%).

For normal working stress levels, the curve of the plotted output signal can be defined as a parabola in which the output in tension increases proportional to the applied load and the output in compression decreases proportional to the applied load. The curve is continuous through zero, but it is not linear. The nonlinearity is defined as the deviation of the output curve from a cord drawn from zero to full scale, as shown in FIG. 3.

When four strain gauges are mounted on the column, as shown in FIG. 1a, the electrical output is given in millivolts per volt by:

$$\frac{v}{V} = \frac{2}{4} \left[ \frac{\Delta R_a}{R_a} - \frac{\Delta R_c}{R_c} \right] \times 1000 \text{ millivolts per volt} \quad (3)$$

Assuming the Poisson ratio to be 0.28 for the column of FIG. 1a, which remains constant throughout the full range of signal output shown in FIG. 3, and further assuming $-\Delta R_c = u \Delta R_a$ and $R_a = R_c$ for simplicity, the output signal is given by:

$$\frac{v}{V} = \frac{2}{4} \frac{\Delta R_a}{R_a} (1 + .28) \times 1000 \quad (4)$$

$$= \frac{2.56}{4} \frac{\Delta R_a}{R_a} \times 1000 = 640 \frac{\Delta R_a}{R_a} \frac{mv}{V} \quad (5)$$

Thus, from equation (4) it can be seen that the output signal v/V is directly proportional to the ratio $\Delta R_a/R_a$. However, that ratio is not linearly proportional to tension, or compression loads.

If the column 10 of FIG. 1a is modified, as shown FIG. 4a and 4b, by machining recesses 11, 12 in opposite sides of the column, strain gauges can be installed on the web 13 of the resulting H-section shown in FIG. 4b and wired up in the same configuration as shown in FIG. 2. The strain gauges will measure the strain in the recessed portion of the column 10. This recessed portion is sometimes referred to hereinafter as the load element. The rest of the modified column 10 above and below the load element is solid, as in the prior art shown in FIG. 1b.

If a compression load is applied to the modified column 10 as shown in FIG. 5a, the stress in the load element will be substantially higher than the stress outside the load element due to the decreased area of the H-shaped load element. The higher cross strains push the flange 14 and 15 of the H-section out. The bent flanges, loaded in compression, induce an action (referred to herein as a beam-column action) which creates a cross load S that reinforces the cross strains $e_c$, and therefore adds a quantity KS to the Poisson ratio. The results are given by:

$$\frac{v}{V} = \frac{2}{4} \frac{\Delta R_a}{R_a} (1 + u + KS) \quad (6)$$

If the compression load is assumed to be negative, then the mv/V ratio will be negative. Conversely, when in tension as shown in FIG. 5b, the cross load from beam-column action subtracts from cross strain, thus:

$$\frac{v}{V} = \frac{2}{4} \frac{\Delta R_a}{R_a} (1 + u - KS) \quad (7)$$

If the tension load is assumed to be positive, the ratio mv/V will be positive. Thus, due to the beam-column action, it is apparent that the value KS adds to the cross strain values in compression and subtracts from the cross strain values in tension. In either case the value KS due to beam-column action changes the output signal v/V as a function of load in a manner that tends to linearize that output signal over the full range of the load cell (+100% to −100% load), and is a function of the applied load.

Various test runs have shown that the linearization is appreciable. However, it is not enough to correct the output signal v/V to the extent required for precision load cell applications. The KS value is a function of the ratio of the web cross-section area to the total cross-section area, as well as the web width to the flange cross-section area. These vary appreciably in load cells of different capacities and designs.

Through experimentation, it has been found that by reducing the diameter of the column 10 at each end of the load element, as shown at 21 and 22 in FIG. 6, the value KS can be increased to the point where the load cell is linear, and even beyond. The reduced diameter sections 21, 22 allow the manufacturer to build a load cell, and then modify its linearizing characteristics by machining more or less of the column in the sections 21 and 22, just enough to linearize the load cell for the best possible configuration over the load range of interest. This then provides a way to manufacture a simple column-type load cell with all the qualities of a complex load cell.

Another technique for enhancing the linearizing effect of the recessed portion is to provide flexures on one or both ends of the column as shown schematically at 31 and 32 in FIG. 7. Such flexures may be made in accordance with the teachings of my U.S. Pat. No. 2,966,049, or as illustrated in FIGS. 8a and 10a. By empirically adjusting the distance of the pivot points of the flexure from the load element, the KS coefficient can be changed in order to arrive at a linearized load cell over the range of interest. The flexures not only provide for linearization but also provide articulation on one or both ends of the load cell, which eliminates bending moment interaction.

FIGS. 8a and 8b show a cylindrical column-type load cell fabricated from cylindrical stock by machining a central reduced diameter portion 60, and then machining recesses in that reduced diameter portion to leave a web for attachment of strain gauges as described with reference to FIGS. 4a and 4b. Note that this embodiment has been provided with flexures 61 and 62 at each end of the column 10'. Larger cylindrical portions are provided for the flexures. For fabricating each flexure, two holes are drilled equally spaced off center, and then cuts are made to intercept the holes along their entire length from one end of the larger-diameter portion. After rotating the column 90° on its axis, two more holes are drilled off center in the same plane as the first pair of holes, and cuts are made to those holes from the opposite end of the larger-diameter cylindrical portion. The result is a flexure comprised of two orthogonal hinges that connect the two ends of the cylindrical portions. But before drilling and cutting, one end is machined to provide a threaded portion for securing the load cell to a base, and the other end is drilled and tapped on the axis of the column to receive a small screw for securing the load cell to a scale platform, for example.

Both of the load cells shown in FIGS. 6 and 7 can be manufactured with a single or double diaphragm at one end. As shown in FIG. 9a, annular diaphragms $40_1$ and $40_2$ are provided so that the load cells may be sealed by a tube in two sections $41_1$ and $41_2$ connected to the diaphragm $40_2$ as shown in greater detail in FIG. 9b of that portion enclosed by a circle 9b in FIG. 9a. The section $41_1$ is welded at the other end to an enlarged diameter section 42 of the column. The other end of the section $41_2$ is connected to the diaphragm $40_1$. These connections of the lower tube sections to the diaphragms are welded or soldered.

The diaphragms $40_1$ and $40_2$, connected to column 43, are sufficiently thin to flex in order to allow the column to deform by a minute amount under load (compression or tension) without subtracting appreciably from the applied load that would be absorbed by the tube cover. Double diaphragms reduce the sensitivity of the load cells to external bending moments since some of the bending moments are transferred through the two diaphragms to the cover tube. Note that this load cell embodies the feature of FIG. 6 in that reduced diameter sections 46 and 47 are provided. This load cell can also be manufactured with just two diaphragms as shown in FIG. 10a at $50_1$ and $50_2$ in order to decrease the axial load carried by a tube cover 51. Note that this load cell of FIG. 10 combines both of the features of this invention that are illustrated in FIGS. 6 and 7 in that reduced diameter sections 52 and 53 are provided as well as flexures 54 and 55 at the ends of the column.

From the foregoing description of the invention, it is evident that the linearizing effect due to the H-shaped cross section of the load element, i.e., the recessed portion of a column, can be modified by machining reduced diameter sections in the column at each end of the load element. In practice, a column of uniform cross section having a recessed portion for the load element is machined to produce reduced diameter sections to a greater and greater depth in increments of about 50 mils until the load cell has the desired linear output characteristics for the desired stress level of the column in its intended application. The desired linearization of a column-type load cell may also be achieved by providing flexures at each end, and modifying the distances of the flexures from the load element. This requires a series of load cells to be fabricated with different distances between the load element and the flexures from which one is selected with the desired linear output characteristics. This empirical approach to design of a load cell using either technique need be accomplished only once for a particular application.

Load cells of the configurations outlined herein have other merits besides linearization. The load elements have a cross section that has large flanges in one plane, which make the load insensitive in bending in that direction because the moment of inertia is large and the strain can be located near the neutral axis. In the other plane, the strain gauges are mounted on a flat web near the neutral axis so that gauges on opposite sides of the web cancel the bending moments. Thus, the load element is very insensitive to bending. Another advantage results from the fact the increased strain resulting from the beam-column action provides a larger output signal. A normal column-type load cell having an output of 2 mv/V at 54,000 psi has a nonlinearity of 0.13%F.S. whereas the load cells shown in FIGS. 6 and 7 have a nonlinearity of 0.05%F.S. at an output of 4 mv/V at approximately 60,000 psi.

Although particular embodiments of the invention have been described and illustrated herein, it is recognized that modifications and variations may readily occur to those skilled in the art. For example, rectangular or square-shaped columns as well as cylindrical columns have been referred to, but other shapes may be applicable, although the most common would be square or cylindrical. Consequently, the claims are to be interpreted to cover such modifications and equivalents.

What I claim is:

1. In a column-type load cell having a column means for linearizing the electrical output signal from axial and cross strain gauges mounted on the column comprising a recessed portion provided in said column, with recesses on opposite sides thereof, which provide a portion of the column with an H-shaped cross section, whereby said portion provides a web between flanges, said gauges being mounted on said web, an improvement comprising a pair of spaced reduced cross section portions defined in the column continuously around a periphery of the column and arranged bracketing said recessed portion for forming means for adjustment of the linearization effect of said recessed portion in the load cell by modifying the cross section of the reduced cross section portions defined in said column.

2. In a column-type load cell as defined in claim 1 including at least one annular diaphragm connected to said column off one end of said recessed portion, an enlarged diameter portion of said column off the end of said recessed portion opposite said one end, and a cylindrical cover over said recessed portion connected at one end to said diaphragm and at the other end to said enlarged diameter portion.

3. In a column-type load cell as defined in claim 1 including first and second annular diaphragms connected to said column, one off each end of said recesses, and a cylindrical cover over said recesses connected at one end to said first diaphragm and at the other end to said second diaphragm.

4. In a column-type load cell as defined in claim 1 including first and second spaced apart diaphragms connected to said column off one end of said recessed portion, an enlarged diameter portion of said column off the end of said recessed portion opposite said one end of said recessed portion, and a cylindrical cover over said diaphragms to cover said recessed portion, and connected at one end to said enlarged diameter portion.

5. In a column-type load cell including a column having a length defined between a pair of spaced ends, and means for linearizing the electrical output signal from axial and cross strain gauges mounted on the column thereof comprising a recessed portion in said column, with recesses on opposite sides thereof, which provide a portion of the column with an H-shaped cross section, whereby said portion provides a web between flanges, said gauges being mounted on said web, an improvement comprising flexure means on at least one end of said column to not only eliminate any bending moment interaction of said load cell with said recessed portion of said column, but also to provide for adjustment of the linearizing effect of said recesses by adjusting the distance of the flexure from the ends of the recessed portion, the flexure comprising two sets of two parallel holes each disposed at about 90° to one another in a common plane transversely of the length of the column, and cuts made in the column outside the common plane to intercept the holes along an entire extent thereof.

6. In a column-type load cell as defined in claim 5, the improvement further comprising a reduced cross section portion defined in the column between the recessed portion and the flexure means, the reduced cross section portion extending continuously around a periphery of the column.

7. In a column-type load cell as defined in claim 6, wherein there are a pair of flexure means and associated reduced cross section portions defined in the column, each of the reduced cross section portions and flexure means being arranged off a respective end of the recessed portion.

* * * * *